United States Patent Office 3,354,501
Patented Nov. 28, 1967

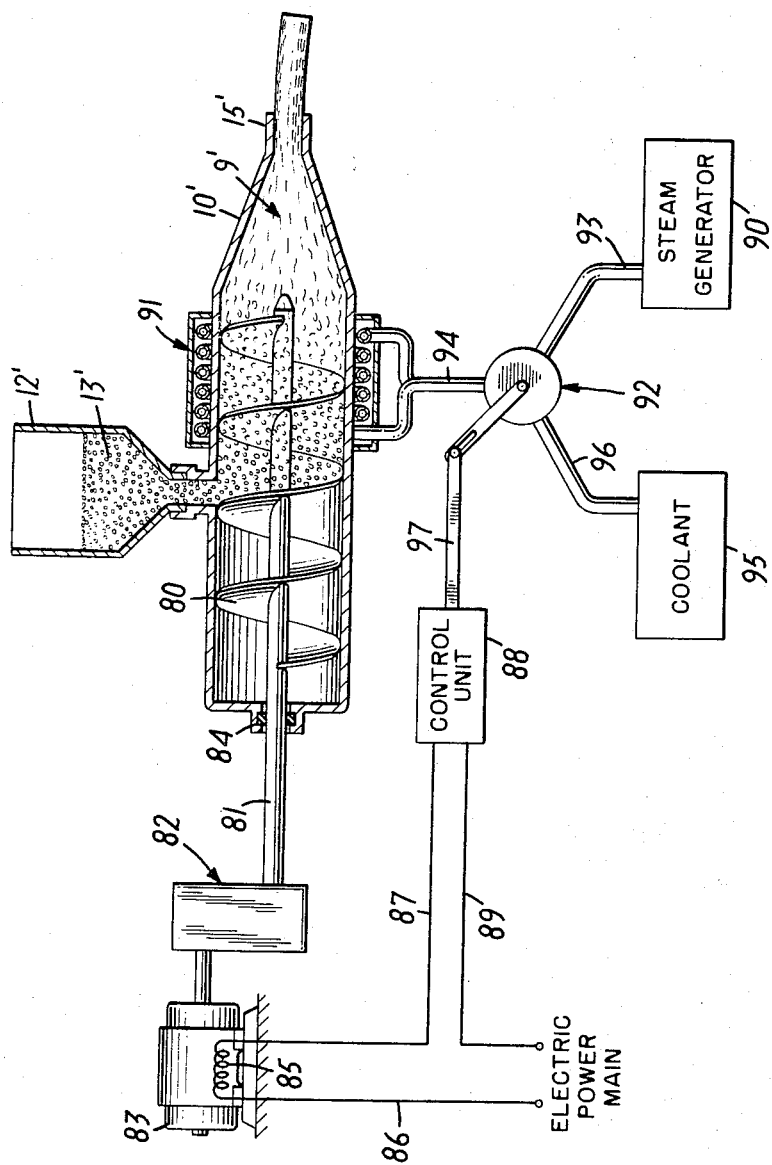

3,354,501
PLASTICIZING APPARATUS WITH AUTOMATIC TEMPERATURE CONTROLLING MEANS
William S. Bachman, Southport, Leo K. Kosowsky, Bridgeport, and Jeremiah W. Deaso, Trumbull, Conn., assignors to Columbia Broadcasting System, Inc., New York, N.Y., a corporation of New York
Filed Dec. 31, 1963, Ser. No. 334,797
16 Claims. (Cl. 18—2)

ABSTRACT OF THE DISCLOSURE

A system for plasticizing molding material by detecting the viscosity of the material in a heating chamber, and regulating the application of heat to the chamber in accordance with the viscosity.

---

This invention relates to an apparatus for controlling the preparation of a plastic material before insertion into a molding die and, more particularly, to a plastic molding method and apparatus wherein the heat applied to the plastic material is automatically controlled so as to maintain uniform consistency of the material.

Plastic molding materials are usually supplied in granular or powdered form so that, before inserting a charge of such material into a die it is necessary to preplasticize it. Preplasticizing is typically accomplished by heating the material within a chamber under controlled conditions, after which the material is extruded from the chamber in a form ready to be inserted into the die. Usually, preplasticizing is carried out as a continuous process with the raw material being supplied to the heating chamber in successive quantities and corresponding quantities being extruded from the chamber by successive strokes of a ram, or by a continuous or intermittent screw drive mechanism. In preplasticizers of this type, however, the amount of heat required to produce the desired plasticity varies with the rate of delivery of the material from the chamber, i.e., the rate of flow of the material through the chamber. As a result, frequent manual readjustment of the chamber temperature is required by the operator. Furthermore, if the chamber temperature is permitted to rise too high, the plastic material will decompose so as to be unsuitable for molding and must be discarded. On the other hand, if the material is underheated insufficient plasticization is obtained and mechanical damage may occur in the ram or screw drive mechanism which forces the material through the chamber.

Accordingly, it is an object of the present invention to overcome the above-mentioned difficulties of conventional plasticizing systems.

Another object of the invention is to provide a novel apparatus for automatically controlling the preparation of a plastic molding material before insertion into a molding die.

A further object of the invention is to provide an improved apparatus for controlling the heat energy applied to a molding material for preplasticizing it.

Still another object of the invention is to provide an improved apparatus for regulating the preplasticizing of a molding material before insertion into a molding die, wherein the application of heat to the material is adjusted by feedback techniques.

These and other objects and advantages of the invention are attained by detecting a property of the material in the chamber which is representative of its plasticization and regulating the application of heat to the chamber in accordance therewith. More particularly, the viscosity of the material is detected as a measure of plasticization and, in one embodiment described herein, the viscosity is detected by measuring the rate at which material is extruded from the chamber by application of a selected pressure to the material. In another embodiment the viscosity is detected by measuring the energy input required to force the material through the chamber.

In one form of apparatus according to the invention, a constant pressure hydraulic ram is reciprocated to deliver discreet amounts of molding material from a chamber for introduction into the molding dies, and the viscosity of the heated material is measured by determining the time required for the ram to extrude a given amount of the material. To this end, the apparatus generates a start signal which activates an adjustable timing device when the hydraulic ram begins its stroke, and the delayed output signal from the timing device initiates the application of heat to the chamber, the application of heat being continued until the ram completes its stroke. Consequently, to the extent that the actual stroke time varies from the desired time, heat is automatically withheld or applied in the required amount, thereby stabilizing the system to a condition wherein the viscosity and, consequently, the plasticity of the material is at a desired level according to the setting of the timing device.

In another form of apparatus according to the invention, a continuous or intermittent screw drive is employed to force the molding material through the chamber for insertion into the molding dies, and the viscosity of the material is measured by determining the energy input required to drive the screw, the workload on the screw being a function of the mechanical resistance or viscosity of the material being forced by the screw through the chamber. By sensing the energy input to the screw drive motor, for example, heat may be applied to or withdrawn from the chamber as required. Thus, to the extent that the energy input to the screw drive motor varies from that corresponding to the desired viscosity of the material, heat is automatically applied or withdrawn in the required amount, so that the system is stabilized to a condition wherein the extruded material has the desired viscosity and plasticity.

All of the above is more fully explained in the detailed description of the preferred embodiments of the invention which follow, this description being illustrated by the accompanying drawings wherein:

FIG. 3 is a schematic diagram, partially in block form and partially in section, of a typical apparatus for the preparation of molding material according to another embodiment of the invention.

Figure 1:
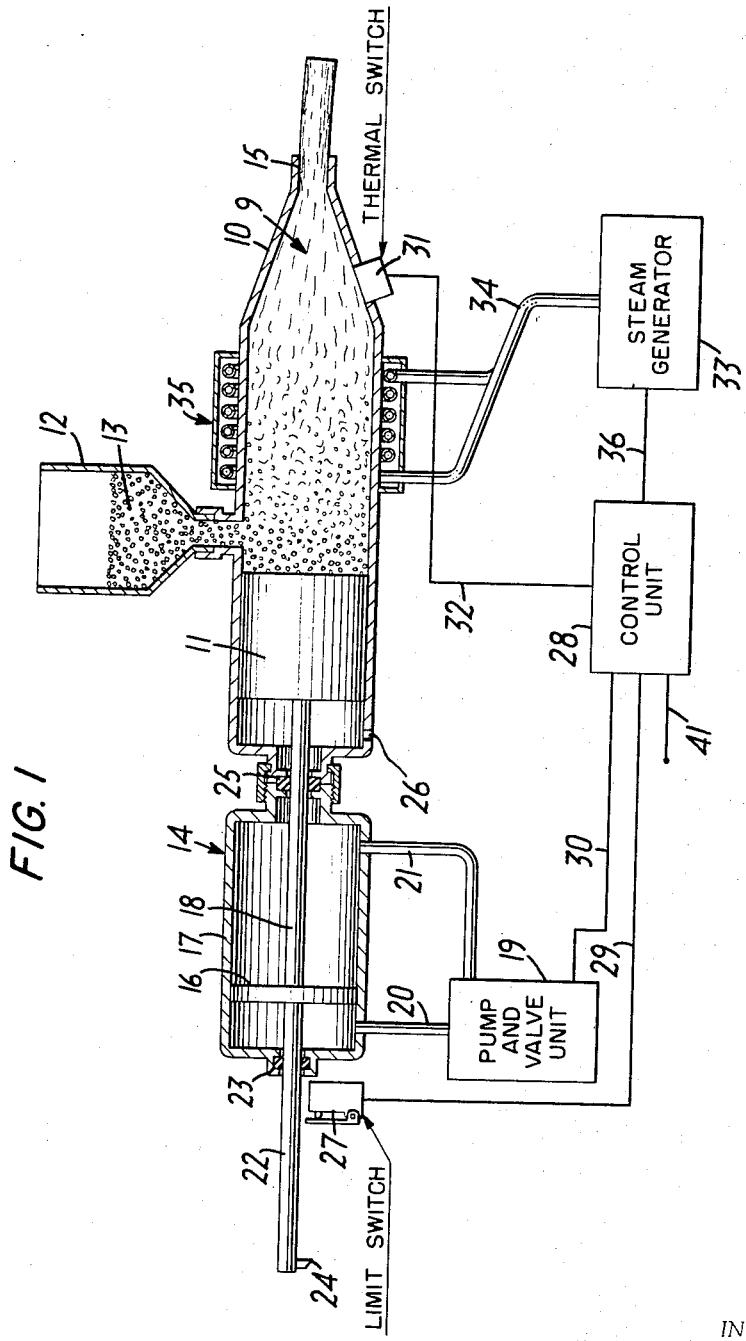
FIG. 1 is a schematic diagram, partially in block form and partially in section, of a typical apparatus for the preparation of molding material according to one embodiment of the present invention.

In the representative embodiment of the invention shown by way of example in FIG. 1, a chamber or barrel 9 is surrounded by a chamber housing 10, through which a ram 11 is adapted to slide, the chamber converging at its forward end to a restricted outlet or discharge port 15. A hopper 12, communicating with the chamber 9 at the rear end, adjacent to the ram 11 in its retracted position, supplies unplasticized molding material 13 in granular or powdered form, for example, into the chamber 9. Although a gravity feed system is illustrated in FIG. 1, it will be understood that any other suitable system may be employed for transferring the material 13 from the hopper to the chamber. To operate the ram 11 so as to force the molding material through the chamber 9 and out of the discharge port 15 after plasticization, a hydraulic drive system 14 comprising a piston 16, slidably mounted within a cylinder 17, and rigidly connected to the ram 11 by a shaft 18, is reciprocable by hydraulic fluid supplied at constant pressure from a pump and valve unit 19 to the cylinder 17 through two conduits 20 and 21. A fluid-tight seal 25 between the cylinder 17 and the chamber 9 allows the shaft 18 to slide freely therebetween while preventing loss of hydraulic fluid from the cylinder, and a vent 26 at the rear of the housing 10 permits air to enter and leave the chamber behind the ram 11 as the ram reciprocates. Rearwardly of the piston 16 a shaft 22 which is affixed to the piston extends out of the cylinder 17 through a fluid-tight seal 23, and a laterally projecting finger 24 on this shaft is disposed to engage and open a normally closed limit switch 27 when the ram 11 reaches its forwardmost position in the chamber 9. The limit switch 27 is electrically connected by a cable 29 to a control unit 28, shown in detail in FIG. 2, which is arranged to control the operation of the pump and valve unit 19 by a signal applied thereto through a cable 30 when the limit switch is actuated. Also, a thermal switch 31, located on the housing 10, is electrically connected to the control unit 28 by a cable 32.

To plasticize the material 13 in the chamber 9, a steam generator 33, controlled from the control unit through a cable 36, is connected by a steam conduit 34 to a jacket 35 mounted on the housing 10 about the chamber 9. Although a steam generator is utilized to supply heat to the chamber 9 in the representative embodiment of the invention described herein because of its effectiveness and economy, it will be understood that any other controllable heat source may be substituted therefor.

Figure 2:
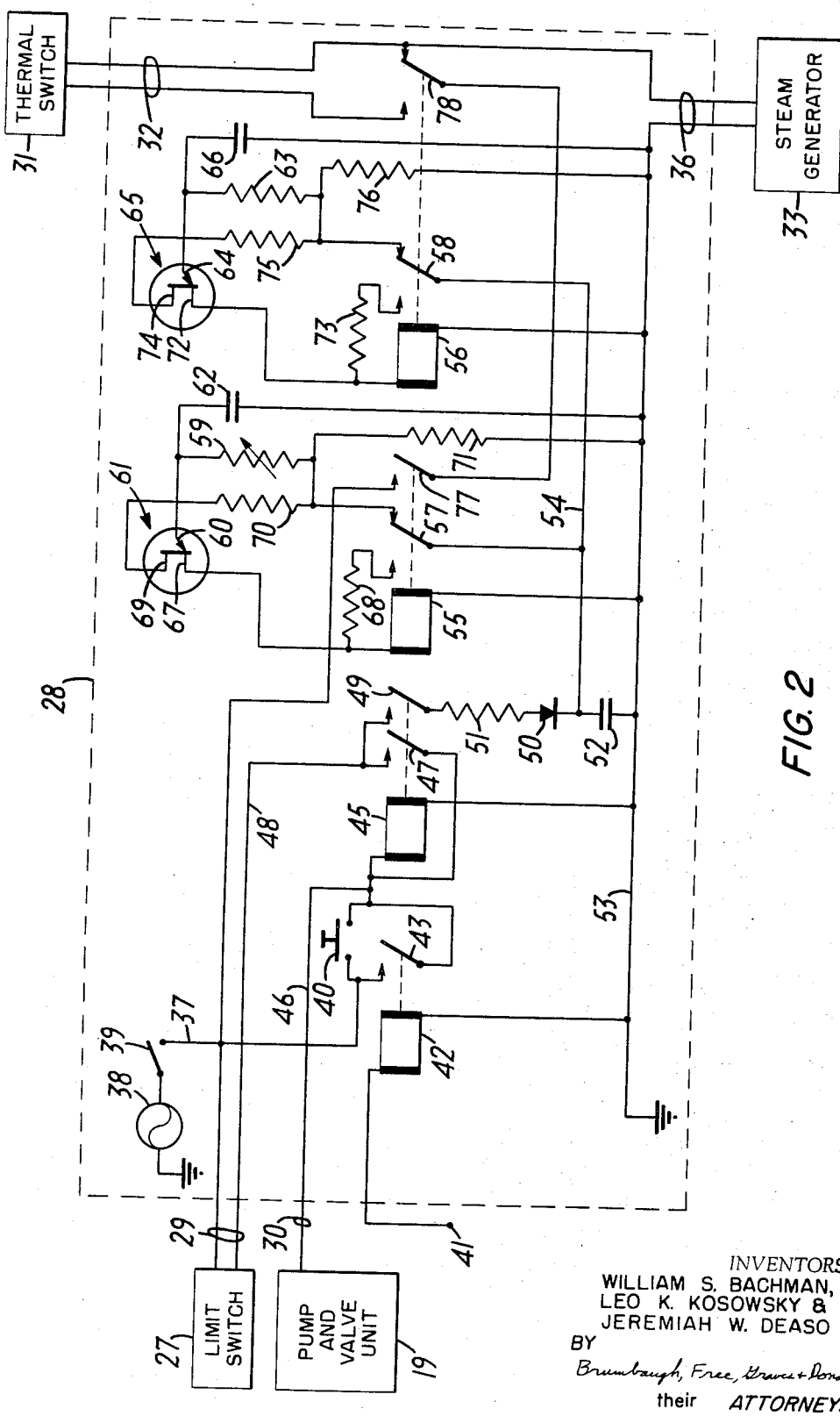
FIG. 2 is a schematic illustration of an electrical circut included in the apparatus of FIG. 1.

Referring now to the schematic electrical diagram of FIG. 2, a power conductor 37 in the control unit 28 is connected to a source 38 of electric power by a switch 39. With the switch 39 closed, a stroke of the hydraulic ram 11 may be initiated either by manual operation of an internal push button 40 or by momentary application of a control voltage from an external remote location to a terminal 41 to energize a power relay 42 and close its normally open contact 43. In either case, line voltage from the conductor 37 will be impressed across a hydraulic control relay solenoid 45 and will be simultaneously applied through a conductor 46 of the cable 30 to the pump and valve unit 19. The unit 19, in the absence of any signal from the control unit, will supply hydraulic fluid to the cylinder 17 so as to drive the piston 16 rearwardly or retain it in the rearward position but, when the conductor 46 is energized, will supply hydraulic fluid to the cylinder 17 so as to drive the piston 16 and the ram 11 in the forward direction. As long as the limit switch 27 remains closed, power from the conductor 37 will be applied through the line 46 to the pump and valve unit 19 by a normally open holding contact 47 which is connected to the limit switch by a conductor 48. At the same time, moreover, power from the line 48 is supplied through a normally open contact 49 of the same relay through a rectifier 50 of the IN1695 type and filter network comprising a resistor 51 and a 300 microfarad capacitor 52 connected to a ground line 53, thereby developing a DC voltage at a conductor 54.

Two control relays 55 and 56 have corresponding movable contacts 57 and 58 connected to the conductor 54 and from the normally closed point of the contact 57 a variable resistor 59 leads to the emitter electrode 60 of a unijunction transistor 61 and through a 100 microfarad capacitor 62 to ground. Similarly, a fixed resistor 63 leads from the normally closed point of the contact 58 to the emitter electrode 64 of another unijunction transistor 65 and through another 100 microfarad capacitor 66 to ground, the value of the resistor 63 being selected to provide a relatively long time constant in the corresponding circuit with respect to that of the circuit containing the variable resistor 59. The transistors 61 and 65 are preferably of the type designated 2N1671A, and one of the base electrodes 67 of the transistor 61 is joined to the relay coil 55 and by a resistor 68 to the normally open point of the contact 57, while the other base electrode 69 of the same transistor is connected by a resistor 70 to the normally closed point of the contact 57, that point also being connected to ground through a resistor 71. Likewise, one base electrode 72 of the transistor 65 is joined to the relay coil 56 and is connected through a resistor 73 to the normally open point of the contact 58 and the other base electrode 74 thereof is connected by a resistor 75 to the normally closed point of the contact 58 which, in turn, is joined to a resistor 76 leading to the ground.

The second movable contact 77 of the relay 55, which has a normally open point connected to the power conductor 37, is joined to a second movable contact 78 of the relay 56 and the normally closed and normally open points of this contact are connected through the cable 32 to the opposite sides of the normally closed thermal switch 31 which is arranged to open when the temperature in the chamber 9 approaches the desired value. In addition, the normally closed point of the switch 78 is connected through the cable 36 to the steam generator 33 so as to open a valve (not shown) therein when energized, and thereby supply steam through the conduit 34 to the jacket 35.

In a representative control system according to the invention, the various resistances shown in FIG. 2 may have the following values:

| | Ohms |
|---|---|
| Resistor 51 | 225 |
| Resistor 59 | 100,000 |
| Resistor 63 | 270,000 |
| Resistors 68 and 73 | 270 |
| Resistors 70 and 75 | 330 |
| Resistors 71 and 76 | 390 |

In operation, with the power switch 39 closed and the piston 16 and the ram 11 in their rearward position as shown in FIG. 1, granular molding material 13 from the hopper 12 passes into the chamber 9. When a control voltage is momentarily applied to the thermal 41, the relay 42 is energized closing the contact 43 and applying power from the conductor 37 through the conductor 46 to the pump and valve unit 19 so as to cause the ram 11 to move forwardly in the chamber 9. At the same time, the relay 45 is actuated and held through the contact 47 and the limit switch 27 and power from the line 48, passing through the contact 49, is rectified and applied to the line 54. This voltage, applied through the variable resistor 59 charges the capacitor 62 at a rate dependent upon the setting of the resistor. When the capacitor 62 reaches a selected voltage after, for example, five to ten seconds, the transistor 61 will be rendered conductive, energizing the relay coil 55, which is then held through the contact 57, and applying power from the line 37 through the contacts 77 and 78 to the steam generator 33 so that heat is supplied to the chamber 9 to plasticize the material therein.

Upon completion of the ram stroke, the limit switch 27 is opened, releasing the solenoid 45 and thereby deenergizing the conductor 54 so that the relay 55 is released and the application of heat to the chamber 9 is discontinued. Deenergization of the line 46, moreover, will cause the pump and valve unit 19 to restore the piston 16 and ram 11 to the position shown in FIG. 1 and, if desired, a further limit switch (not shown) may be utilized to detect this condition and apply power to the terminal 41 so as to initiate the next ram cycle. If the plasticizer has been in operation for several cycles so that an equilibrium condition has been attained, the viscosity of the material in the chamber 9 will be low enough so that the ram stroke is completed a short time after the relay 55 operates and, consequently, the heat applied during the interval between operation of the relay 55 and termination of the stroke will be just sufficient to plasticize the quantity of granular material added to the chamber prior to the stroke and thereby maintain the same viscosity. If the material in the chamber is not heated sufficiently so as to be plasticized to the desired degree, its viscosity will be higher and the ram stroke will take a correspondingly longer time so that more than the usual quantity of heat is applied and the chamber temperature is raised to reduce the viscosity and increase the plasticization of the material. On the other hand, if the chamber temperature is higher than necessary, the viscosity of the material will be lower and the time during which heat is applied will be correspondingly shorter, reducing the amount of heat applied during the stroke and thereby lowering the chamber temperature. Adjustment of the length of time in which heat is applied during a given stroke so that the desired viscosity and plasticity of the material are maintained automatically is accomplished by changing the setting of the variable resistor 59.

When the plasticizer is operated with the chamber 9 relatively cold, as during the start-up of the plasticizer, the viscosity of the material in the chamber will be very high, so that the ram 11 may not initially be able to move at all at the applied hydraulic pressure or will move only very slowly until the material has been heated substantially. Accordingly, the first stroke of the ram will require a correspondingly long time, of the order of a minute or more, during which, after operation of the relay 55, heat is applied to the chamber from the steam generator 33. In order to prevent overheating and consequent deterioration of the material in the chamber under these conditions, the relay 56 and its associated circuit are utilized. In this regard, power from the line 54 applied through the normally closed point of the contact 58 charges the capacitor 66 through the resistor 63 which, as pointed out above, provides a considerably longer time constant for its circuit than does the resistor 59, for example 30 seconds. After this delay, the transistor 65 becomes conductive, causing the relay 56 to operate, the normally open point of the contact 58 being effective to hold the relay until the line 54 is deenergized. Upon operation of this relay, transfer of the contact 78 interposes the normally closed thermal switch 31 in the circuit leading from the power line 37 through the contact 77 to the steam generator and, accordingly, if the chamber temperature is raised too high, the switch 31 opens to discontinue application of heat. During this interval, of course, the material in the chamber has been heated considerably and its viscosity thereby reduced so that the ram stroke can be completed. After one or two strokes have been carried out in this manner, the chamber temperature will be high enough so that the stroke is completed within thirty seconds, and thereafter the relay 56 is inoperative. Furthermore, with this type of temperature control the material extruded from the plasticizer after one or two ram strokes is sufficiently plasticized for use, so that only the material extruded during those strokes must be discarded because of insufficient plasticization.

Another form of the invention, incorporating a screw type extruder, is shown by way of example in FIG. 3. The extruder comprises a chamber 9' formed in a housing 10', within which a screw 80 is adapted to turn. As in the embodiment previously described, the chamber 9' converges at its forward end to a restricted discharge port 15', and a hopper 12', communicating with the chamber 9' at the rear end, supplies unplasticized molding material 13' into the chamber 9'. The screw 80 is mounted on a shaft 81 coupled through suitable gearing 82 to the shaft of an electric drive motor 83, a conventional fluid-tight seal 84 being provided to prevent leakage of the plasticized material from the housing 10' around the shaft 81.

The armature winding 85 of the screw drive motor 83 is electrically connected directly to one electric power main terminal by a conductor 86 and by a conductor 87 through a control unit 88 and a conductor 89 to another electric power main terminal.

To plasticize the material 13' in the chamber 9', a steam generator 90 is connected to a jacket 91 mounted on the housing 10' through a valve 92 and conduits 93 and 94. Overheating of the material 13' may be prevented by circulating a coolant 95 through the jacket 91 by way of a conduit 96, the valve 92 and the conduit 94. The valve 92 is mechanically linked to the control unit 88 by a linkage 97 which is adapted to manipulate the valve 92 to connect the conduits 93 and 96 selectively to the conduit 94 to supply either steam or coolant to the latter as required. Such valves are well known to the art and need no detailed explanation. Alternatively, the jacket 91 may be supplied with two interlaced but independent coil systems, one for steam and the other for the coolant, in which case the valve 92 would be modified accordingly to control the supply of steam and coolant to the two coil systems, respectively, as required.

The control unit 88 is adapted to sense variations in the energy input to the screw drive motor 83 and to actuate the valve 92 through the linkage 97 so as to initiate action to compensate for such variations. To this end, the control unit 88 may be a device responsive to the current drawn in the armature circuit of the motor 83, which is a measure of the energy input thereto. Thus, it may be a solenoid connected between the conductors 87 and 89, having an armature, suitably biased by spring or magnetic means, connected to the linkage 97.

In operation, the electric motor 83 turns the screw 80, whereby molding material 13' passing from the hopper 12' into the chamber 9' is forced out of the discharge port 15'. If the material in the chamber is not heated sufficiently to be plasticized to the desired degree, its viscosity will increase the load on the screw 80, causing the motor 83 to slow down. As the motor speed decreases, the armature current will increase according to the speed-current characteristic of the motor. The control unit 88 senses the increase in armature current and actuates the valve 92 to apply steam to the jacket 91, thus increasing the temperature in the chamber 9' and reducing the viscosity of the material. Contrariwise, if the chamber temperature is higher than necessary, the speed of the screw 80 will increase and the armature current will decrease. This change is translated to the valve 92 so as to reduce or terminate the application of steam to the jacket. If the current decreases sufficiently, the control unit 88 will apply coolant to the jacket 91. In this way, the chamber temperature is reduced to increase the viscosity and obtain the desired plasticity of the material. If desired, a thermostatic element (not shown) may be provided on the housing 10', as in FIG. 1, and connected to the control unit 88 or to the valve 92, as appropriate, to prevent overheating and possible deterioration of the material in the chamber 9'.

Thus it can be seen that the present invention produces molding material of the desired plasticization by sensing the viscosity of the processed material and automatically adjusting by feedback control the heat applied to the material during processing so as to provide and maintain the desired degree of plasticization. Moreover, rapid warmup of the apparatus is accomplished but, at the same time overheating of the material is effectively prevented.

While the fundamental novel features of the invention have been shown and described, it will be understood that various substitutions, changes and modifications in the form and details of the apparatus illustrated and its manner of operation may be made by those skilled in the art without departing from the spirit of the invention. For example, well known electrical or radiant heating techniques could be employed rather than the steam arrangement described above. All such variations and modifications, therefore, are included within the intended scope of the invention as defined by the following claims.

We claim:

1. Apparatus for plasticizing molding material comprising:

means forming a chamber for receiving material to be plasticized, means for controlling the temperature of the chamber,
means for sensing the viscosity of the material in the chamber, and
means responsive to the viscosity sensing means for adjusting the temperature controlling means.

2. Apparatus for plasticizing molding material comprising:
means forming a chamber for receiving material to be plasticized and having a restricted outlet through which plasticized material is extruded,
means movable in the chamber for applying pressure to the material in the chamber so as to extrude the material through the restricted outlet, and
means responsive to the viscosity of the material being extruded through the restricted outlet for controlling the temperature of the chamber.

3. Apparatus for plasticizing molding material comprising:
means forming a chamber for receiving material to be plasticized and having a restricted outlet through which plasticized material is extruded,
ram means movable in the chamber for applying pressure to the material in the chamber so as to extrude the material through the restricted outlet,
means for applying heat to the chamber, and
timing means, operable in conjunction with the ram means, for controlling the means for applying heat to the chamber in accordance with the rate at which material is extruded from the chamber.

4. Apparatus according to claim 3 including:
means for driving the ram means at constant pressure, and
detecting means for determining the duration of a stroke of selected length of the ram means and operable in conjunction with the timing means to control the means for applying heat to the chamber.

5. Apparatus according to claim 3 in which the timing means comprises means responsive to the initiation of a ram stroke to initiate operation of the means for applying heat to the chamber at a selected time after the initiation of the stroke.

6. Apparatus according to claim 5 including means responsive to the termination of the ram stroke for controlling the means for applying heat so as to discontinue the application of heat to the chamber.

7. Apparatus according to claim 5 including thermal switch means responsive to the temperature of the chamber and wherein the timing means includes means for interposing the thermal switch means between the means responsive to the initiation of a ram stroke and the means for applying heat at a time after initiation of a ram stroke which is longer than the selected time.

8. Apparatus for plasticizing molding material comprising:
a housing forming a chamber for receiving molding material to be plasticized and having a restricted outlet at one end through which plasticized molding material is extruded,
a ram movable in the chamber for applying pressure to the material so as to extrude the material through the restricted outlet,
hydraulic cylinder means operable at constant pressure to move the ram in the chamber in the direction to extrude material,
heating means in the housing and surrounding the chamber to apply heat thereto,
adjustable time delay means responsive to the initiation of a ram stroke to produce, at a selected time thereafter, a signal initiating operation of the heating means,
means responsive to completion of the ram stroke for deactivating said heating means, and
means responsive to completion of the ram stroke for resetting said time delay means.

9. Apparatus according to claim 8 including thermal switch means responsive to the chamber temperature, and second time delay means responsive to initiation of a ram stroke to interpose, at a time thereafter which is greater than the selected time, the thermal switch means between the adjustable time delay means and the heating means.

10. Apparatus for plasticizing molding material comprising:
means forming a chamber for receiving material to be plasticized and having a restricted outlet through which plasticized material is extruded,
means movable in the chamber for applying pressure to the material in the chamber so as to extrude the material through the restricted outlet,
drive means for moving the movable means, and
means responsive to the energy input to the drive means during extrusion of the material through the restricted outlet for controlling the temperature of the chamber.

11. Apparatus according to claim 10 in which the movable means comprises a screw turnable in the chamber and the drive means comprises an electric motor mechanically coupled to the screw.

12. Apparatus according to claim 10 in which the control means includes heat exchanger means in heat transfer relation to the chamber.

13. Apparatus according to claim 12 in which the heat exchanger means includes means for applying heat to the chamber, and means for applying coolant to the chamber, and the control means includes means responsive to the energy input to the drive means for selectively adjusting the heat applying means and the coolant applying means.

14. Apparatus according to claim 12 in which the heat exchanger means includes jacket means in heat transfer relation to the chamber, heating means, and cooling means, and the control means includes valve means responsive to the energy input to the drive means for adjustably coupling the heating means and the cooling means with the jacket means.

15. Apparatus according to claim 10 in which the drive means includes an electric motor mechanically coupled to the movable means, and the control means is responsive to the electrical current supplied to the electric motor.

16. Apparatus according to claim 14 in which the drive means includes an electric motor mechanically coupled to the movable means, and the control means includes electromechanical means responsive to the electrical current supplied to the electric motor for actuating the valve means.

References Cited

UNITED STATES PATENTS

| | | | |
|---|---|---|---|
| 2,340,673 | 2/1944 | Lotz et al. | 18—21 |
| 3,078,513 | 2/1963 | Levison et al. | 18—21 |
| 3,148,231 | 9/1964 | Spencer | 18—21 |

J. SPENCER OVERHOLSER, *Primary Examiner.*

W. L. McBAY, *Assistant Examiner.*